United States Patent [19]

Munakata

[11] Patent Number: 5,841,549
[45] Date of Patent: Nov. 24, 1998

[54] METHOD AND APPARATUS FOR FORMING SINGLE-COLOR AND MULTI-COLOR IMAGES

[75] Inventor: Atsushi Munakata, Yokohama, Japan

[73] Assignee: Canon Kabushiki Kaisha, Tokyo, Japan

[21] Appl. No.: 864,527

[22] Filed: May 28, 1997

Related U.S. Application Data

[63] Continuation of Ser. No. 280,126, Jul. 25, 1994, abandoned.

[30] Foreign Application Priority Data

Jul. 26, 1993 [JP] Japan .................................. 5-184210

[51] Int. Cl.⁶ ...................................................... H04N 1/46
[52] U.S. Cl. ......................... 358/296; 358/501; 358/502; 347/9; 347/43
[58] Field of Search ..................... 358/296, 401, 358/434, 443, 447, 501, 502; 347/3, 5, 12–14, 43, 9

[56] References Cited

U.S. PATENT DOCUMENTS

| | | |
|---|---|---|
| 4,247,872 | 1/1981 | Wada et al. .......................... 358/443 X |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,851,923 | 7/1989 | Abe et al. ................................ 358/296 |
| 4,958,236 | 9/1990 | Nagashima et al. ................ 358/296 X |
| 5,044,796 | 9/1991 | Lund .................................. 400/121 X |
| 5,321,467 | 6/1994 | Tanaka et al. . |
| 5,359,355 | 10/1994 | Nagoshi et al. ............................. 347/9 |
| 5,373,368 | 12/1994 | Taniguro ................................. 358/296 |
| 5,500,661 | 3/1996 | Matsubara et al. .................... 347/43 X |

FOREIGN PATENT DOCUMENTS

| | | |
|---|---|---|
| 54-056847 | 5/1979 | Japan . |
| 59-79759 | 5/1984 | Japan . |
| 59-123670 | 7/1984 | Japan . |
| 59-138461 | 8/1984 | Japan . |
| 60-071260 | 4/1985 | Japan . |
| 2-2051 | 1/1990 | Japan . |
| 4-9153 | 2/1992 | Japan . |
| 4-90371 | 3/1992 | Japan . |

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

An image forming apparatus includes a plurality of recording heads arranged in parallel along a scanning direction perpendicular to a direction of transferring a recording medium to perform a recording movement for recording an image selected from a single-color image and a multicolor image in accordance with the image data. The recording heads record the multicolor image during a period of moving in one direction and record the single-color image during a period of moving in two opposite directions.

20 Claims, 12 Drawing Sheets

METHOD AND APPARATUS FOR FORMING SINGLE-COLOR AND MULTI-COLOR IMAGES

This application is a continuation of application Ser. No. 08/280,126 filed Jul. 25, 1994, now abandoned.

BACKGROUND OF THE INVENTION

1. Field of the Invention

The present invention relates to image-forming methods and apparatuses used for recording images on recording media. The present invention particularly relates to methods of forming multicolor images and serial image-forming apparatuses using such methods, for example, copying machines that form the multicolor images on the recording media by performing the process of ink-jet recording. In the following description, unless indicated otherwise, the term "image" includes a meaning of character, picture, photo, or the like, and also the term "image formation", "recording", or "printing" includes a meaning of forming the image on a surface of the recording medium in accordance with image data.

2. Description of the Related Art

An ink-jet recording process has been well known as a non-impact process for the image formation. The ink-jet process includes the steps of ejecting ink droplets in accordance with recording signals and depositing them directly on a recording medium selected from cloth, paper, plastic sheet, or the like. An image-forming apparatus that performs the ink-jet process is able to record an image on the recording medium with high-recording density at a high-recording speed. Therefore, in recent years, dozens of serial image-forming apparatuses in the type of ink-jet, such as copying machines, facsimiles, and printing machines, have been commercially manufactured and used.

The conventional ink-jet type image-forming apparatus mainly comprises: a carriage for removably or stationarily holding a recording head (or a recording head unit consisting of a plurality of recording heads); a feeder device for transferring the recording medium in a sub-scanning direction; a driving device for moving the recording head back and forth in a main-scanning direction defined as the direction perpendicular to a the sub-scanning direction; and a control device for controlling each function of the above devices. The image-forming apparatus performs the image formation by a serial-scanning movement of the recording head in the main-scanning direction. During the serial-scanning movement, the recording head moves along the line of image to produce one character or the like at once by ejecting ink droplets from its orifices. At an interval of the serial-scanning movements of the recording head (i.e., at a period that the recording head is being inactivated), on the other hand, the feeder device transfers the recording medium intermittently for a distance corresponding to a recording width of the recording head, which corresponds to a vertical length of rows of the orifices in a sub-scanning direction defined as the direction of transferring the recording medium.

As described above, the ink-jet process is performed by ejecting the ink droplets from the orifices of the recording head onto the recording medium in accordance with recording signals. Therefore, the ink-jet process has been used overwhelmingly because of its excellent cost/performance ratio and its practical features especially marked by excellent image qualities and noiseless operation. In the ink-jet apparatus, furthermore, the orifices of the recording head are arranged in rows in the sub-scanning direction. The recording head prints a line of the image with a width corresponding with the number of the orifices by performing one serial-scanning movement described above, resulting a high-speed printing.

Image-forming apparatuses for forming fullcolor images have been also commercially manufactured and used. The color image-forming apparatus comprises three or four recording heads corresponding to three fundamental colors (yellow, magenta, and cyan) or four colors (three fundamental colors and black), respectively, to form a multicolor image in accordance with a well-known subtractive color process. Every color can be prepared by mixing three fundamental colors in appropriate proportions, for example a red color can be obtained by mixing a yellow ink and a magenta ink, while a blue color can be obtained by mixing a magenta ink and a cyan ink. In the case of a serial-scanning type, the recording heads of three fundamental colors, or with the recording head of black are arranged in the direction of their movements for improving color tone. However the arrangement of the recording heads is not in particular order.

The conventional color image-forming apparatuses brought to the marketplace require further improvements on their image qualities and image-forming speeds to request their users' demands. However they have some problems. In the serial-scanning type, for example, one of the problems is that different color tone appears at each line of the image and causes remarkable reduction in the image quality. These defects are the results of forming the smallest image-forming element (i.e., a pixel) by putting dots on top of one another in order of the arrangement of the recording heads of three fundamental colors (yellow, magenta, and cyan) or four colors (three fundamental colors and black) in the direction of main-scanning. That is, these colors are recorded in different order during a period of moving the recording heads in two opposite directions (i.e., during their forward and backward movement) respectively, and thus different color tones can be appear at each line of the multicolor image.

To solve the problem, there is an idea of recording the image only on the one way of moving the recording heads back and forth. In general, however, the distance that the recording head moves from one position to another by one serial-scanning movement is much larger than the recording width of the recording head. The time required for returning the recording head to the starting position for the further printing is much larger than the time required for moving the recording medium for the distance corresponding with the above recording width. Consequently, the rate of forming the image by the serial-scanning movement in one direction is much lower compared with that of the serial-scanning movement in two opposite directions.

One may notice that the color image-forming apparatus is sometimes available in printing a single-color image, for example forming a black-and-white picture by using only one of the color recording heads. However, the rate of forming the single-color image is almost the same as that of the multicolor image formation because of the following problems. One of the problems of the conventional apparatus is that the single- and multi-color images are only formed by the movement of the recording heads in one direction and thus both take the same length of time for printing one line from one position to another and returning the recording heads to the first position for starting the further printing.

SUMMARY OF THE INVENTION

It is an object of the present invention to provide image-forming methods and image-forming apparatuses to be used for forming single color images and multicolor images by the different recording movements of the recording heads.

According to a first aspect of the present invention, there is provided an image-forming apparatus including transport means, generation means, a plurality of recording heads, movement means, selection means and control means. The transport means transports a recording medium. The generation means generates image data. The plurality of recording heads is arranged along a scanning direction different from a direction of transporting the recording medium for recording an image in accordance with the image data. The movement means moves the plurality of recording heads in the scanning direction to perform a recording movement. The selection means selects either a first mode in which a multicolor image is formed by the plurality of recording heads during a period of moving in one direction or a second mode in which a single-color image is formed by one of the plurality of recording heads in two opposite directions. The control means controls the recording movement of the plurality of recording heads in accordance with the mode selected by the selection means.

Here, the selection means may be provided as a hand-operated switching system on an operation panel by which the first mode or the second mode is manually selected.

The selection means may be provided as an external input device by which the first mode or the second mode is selected.

The generation means may comprise an image reader having a CCD image sensor which picks up image information on an original with a serial-scanning movement thereof during a period of moving at least in one direction.

The CCD image sensor may pick up the image information on the original with the serial-scanning movement thereof during a period of moving at least in one direction in accordance with selected mode.

The generation means may obtain image information from an external input device.

An image-forming apparatus may further comprise storing means for storing at least a part of the image data which corresponds to an image to be formed by one scanning movement of the plurality of recording heads.

Each recording head of the plurality of recording heads may comprise electro-thermal converting elements for generating energies to be used for ejecting ink droplets on the recording medium by causing a film boiling phenomena in ink.

According to a second aspect of the present invention, there is provided an image-forming apparatus including transport means, generation means, a plurality of recording heads, movement means, selection means, control means and judging means. The transport means transports a recording medium. The generation means generates image data. The plurality of recording heads is arranged along a scanning direction different from a direction of transporting the recording medium for recording an image in accordance with the image data. The movement means moves the plurality of recording heads in the scanning direction to perform a recording movement. The selection means selects one mode from a first mode in which a multicolor image is formed by the plurality of recording heads during a period of moving in one direction, a second mode in which a single-color image is formed by one of the plurality of recording heads during a period of moving in two opposite directions, and a third mode in which a combination of images is formed by performing both the first and second modes. The control means controls the recording movement of the plurality of recording heads in accordance with the mode selected by the selection means. The judging means judges, when the image is comprised of single color areas and multi-color areas with shapes of rectangles, a size of each single color area. The one mode is selected from the first, second, and third modes in accordance with a result of the judging by the judging means.

Here, the size of each single-color area may be estimated and inputted by means of a digitizer.

A part of the single-color area of the image may be recorded under the first mode while remaining part thereof is recorded under the second mode when the size of the single-color area meets criteria of:

$W > 2\,RW$; and $L = RL$ where
"W" is a width of the single-color area in the direction of transferring the recording medium;
"L" is a length of the single-color area in the direction perpendicular to the direction of transferring the recording medium;
"RW" is a recording width of the recording head in the direction perpendicular to the direction of scanning movement; and
"RL" is a recording length of the recording head in the direction of scanning movement.

The selection means for selecting one mode may be provided as a hand-operated switching system on an operation panel by which the mode is manually selected from the first, second, and third modes.

The selection means for selecting one mode may be provided as an external input device by which the one mode is selected from the first, second, and third modes.

The generation means may comprise an image reader having a CCD image sensor which picks up image information on an original with a serial-scanning movement thereof during a period of moving at least in one direction.

The CCD image sensor may pick up the image information on the original with the serial-scanning movement thereof during a period of moving at least in one direction in accordance with selected mode.

The generation means may obtain an image information from an external input device.

An image-forming apparatus may further comprise storing means for storing at least a part of the image data which corresponds to an image to be formed by one scanning movement of the plurality of recording heads.

Each recording head of the plurality of recording heads may comprise electro-thermal converting elements for generating energies to be used for ejecting ink droplets on the recording medium by causing a film boiling phenomena in ink.

According to a third aspect of the present invention, there is provided a method of forming an image on a recording medium by using a plurality of recording heads arranged along a scanning direction different from a direction of transporting the recording medium and moving said plurality of recording heads back and forth in the scanning direction in accordance with image data. The method includes the step of judging whether the image is of a single-color type corresponding to one of the plurality of recording heads or a multi-color type. The method further includes the steps of recording the image during a period of moving the plurality of recording heads in two opposite directions when the image is judged in the judging step to be of the single-color type corresponding to one of the plurality of recording heads, and recording the image during a period of moving the plurality of recording heads in one of two opposite directions when the image is judged to be of the multi-color type.

According to a fourth aspect of the present invention, there is provided a method of forming an image on a recording medium by using a plurality of recording heads arranged in parallel along a scanning direction different from a direction of transporting the recording medium and moving the plurality of recording heads back and forth in the scanning direction in accordance with image data. The method includes the step of judging whether the image is of a single-color type corresponding to one of the plurality of recording heads or a multi-color type. The method also includes the steps of recording the image during a period of moving the plurality of recording heads in two opposite directions when the image is judged in the judging step to be of the single-color type corresponding to one of the plurality of recording heads, and recording the image during a period of moving the plurality of recording heads in one of two opposite directions when the image is judged to be of the multi-color type. Further, when the image is comprised of a single-color image area and a multicolor image area with shapes of rectangles, a size of each single color area is judged, and a part of the single-color image area of the image is recorded during a period of moving the plurality of recording heads in one of two opposite directions, and a remaining part of the single-color image area of the image is recorded during a period of moving the plurality of recording heads in two opposite directions, when the size of the single-color area meets criteria of:

W>2 RW; and

L=RL.

"W" is a width of the single-color area in the direction of transporting the recording medium, "L" is a length of said single-color area in the direction perpendicular to the direction of transporting the recording medium, "RW" is a recording width of the recording heads in the direction perpendicular to the direction of scanning movement, and "RL" is a recording length of the recording heads in the direction of scanning movement.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
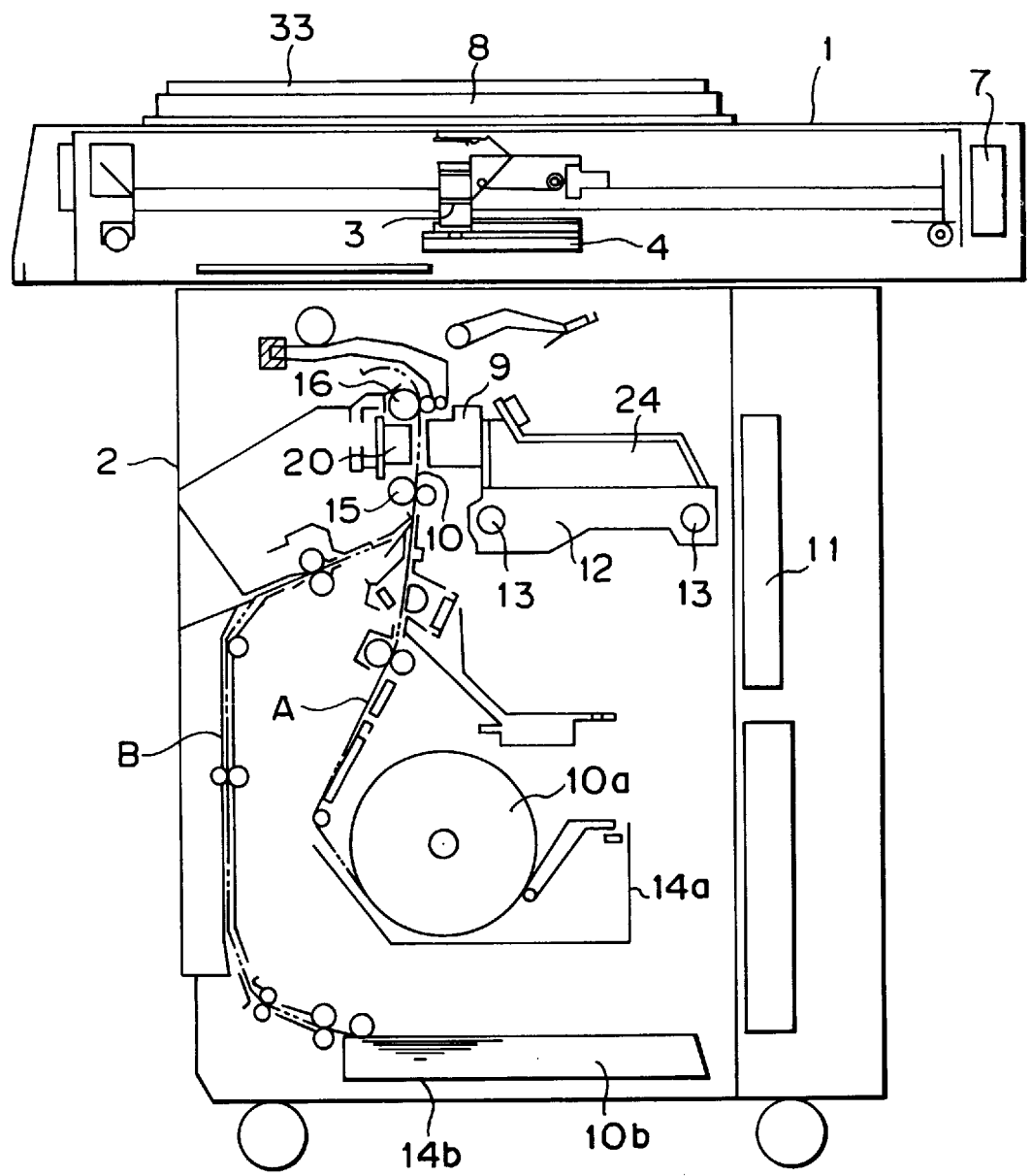
FIG. 1 shows a schematic illustration of a color copying machine as one of the preferred embodiments of the present invention.

We are now explaining preferred embodiments of the image-forming apparatuses of the present invention, concretely, with reference to the attached drawings.

Throughout the following detailed description, similar reference numeral refer to similar elements in all figures of the drawings.

The present invention is not to be interpreted in a limiting sense, and may be adapted to various embodiments and modifications satisfying the purpose of the invention.

EXAMPLE 1

We are now explaining one of the preferred embodiment of the present invention with consideration of FIGS. 1–7.

FIG. 1 shows a color copying machine as one of the preferred embodiments of the present invention.

The color copying machine mainly comprises a reader section 1 and an image-forming section 2.

The reader section 1 is responsible to read an original document which can be selected from almost any documents including photos, illustrations, graphics, and text. The reader section 1 also processes the obtained information into data represented in a form suitable for the process to be performed by the image-forming section 2. The reader section 1 comprises: a charge-coupled device (CCD) image sensor 3; a carriage 4 for shifting the position of the sensor 3 in two different directions (i.e., a main-scanning direction 31 in which the sensor 3 reads a line of the original and a sub-scanning direction 32 in which the sensor 3 shifts one line to another, and these directions are perpendicular with each other) by means of two stepping motors 5 and 6 (see FIG. 4); and an image-processing device 7 for processing the information obtained by the CCD image sensor 3.

The CCD image sensor 3 scans a surface of the original document being placed on a document glass (i.e., a transparent glass) 8 and captures the information thereof as read data for the image formation. The image-processing device 7 converts the read data into image data, or with some modification if required, for the process to be performed by the image-forming section 2.

The image-forming section 2 comprises a recording head unit 9 for recording an image on a recording medium 10 (i.e., paper, film, cloth, or the like) in accordance with the image data provided by the reader section 1 through a storage device 11.

The recording head unit 9 is mounted on a carriage 12 so as to provide a plurality of orifices thereof to face a surface of the recording medium 10 at a constant distance. Also, the carriage 12 is supported by a pair of rods 13 parallel to the main-scanning direction and travels along the rods 13 by a driving means (not shown) toward the direction indicated by an arrow 22 or 23 in FIG. 2.

Figure 2:
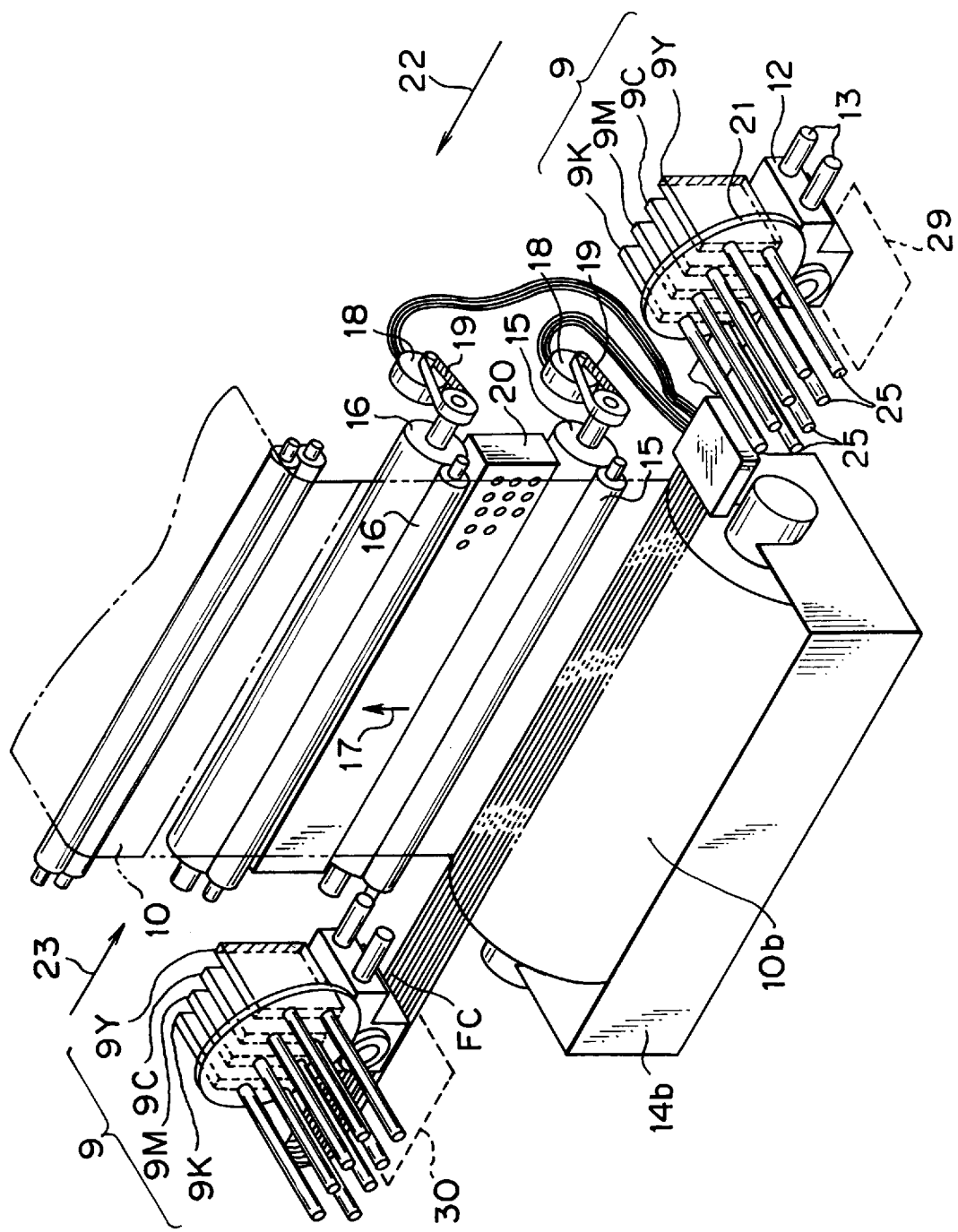
FIG. 2 shows a perspective view of the image-forming section of the color copying machine.

The recording medium 10 is provided as a roll of paper 10a in a tray 14a or as a batch of sheets 10b in a sheet feeder 14b. Thus the recording medium 10 moves toward the front of the recording head unit 9 through a path A or B. In the image-forming section, the recording medium 10, for example supplied from the roll paper tray 14b, is held by a pair of transport rollers 15 and a pair of tension rollers 16 so as to follow a pointing arrow 17 (FIG. 2). These rollers 15 and 16 are rotated by means of driving motors 18 and belts 19 for moving the recording medium 10 intermittently.

The recording surface of the recording medium 10 is supported by a platen 20. In this example, the platen 20 has the shape of a rectangle having a longitudinal side parallel to the transport rollers 15. By using a suction device (not shown), the recording medium 10 attaches to the platen 20 without causing any space between them and without causing any line made by pressing, folding, or wrinkling.

FIG. 2 shows a perspective view of the image-forming section 2 of the color copying machine.

The section 2 comprises one recording head unit 9 as a set of color recording heads. For only making easier to understand a serial-scanning movement of the recording head unit 9, however two recording head units 9 are illustrated in the figure.

In this example, the recording head unit 9 is composed of four different recording heads: a black head 9Bk; a cyan head 9C; a yellow head 9Y; and a magenta head 9M, corresponding to colors of black (Bk), cyan (C), yellow (Y), and magenta (M), respectively. These heads are supported on the carriage 12 by a supporting element 21 and receive black (Bk), cyan (C), yellow (Y), and magenta (M) inks from corresponding ink reservoirs 24 (see FIG. 1) through their ink pipes 25, respectively. In addition, the recording head unit 9 connects with a flexible cable FC by which each head receives control signals from a control device 100 shown in FIG. 3.

The recording heads 9Bk, 9C, 9Y, and 9M are in the type of "ink-jet head" and arranged in a line parallel to the arrow 22 or 23 in the direction of printing the image on the recording medium 10. Also, each recording head comprises a plurality of orifices; a plurality of energy-converters (i.e., electro-thermal converting elements, for example heat resistors) for converting electric energy into heat energy to be used for ejecting ink droplets from the orifices; and a heater board as a base for supporting the energy-converters and other elements. In this example, the above orifices are formed on the head at a density of 16 orifices per millimeter, corresponding to 400 dpi (dot per inch), but not limited to such density.

During the period of the image formation, each head of the recording head unit 9 participates in providing respective colors in the image according to the data from the image-processing device 7. Each electro-thermal converting elements of the recording head receives voltage pulses, individually. When one electric pulse is applied to the electro-thermal converting element, the element can be heated enough to cause a film boiling phenomenon in which one large sized bubble is formed by evaporating the ink around the element. The bubble applies pressure to the ink to discharge one flying ink droplet from the orifice. Therefore the flying ink droplet can be repeatedly discharged from the orifice by applying the electric pulses repeatedly on the electro-thermal converting element.

Figure 3:
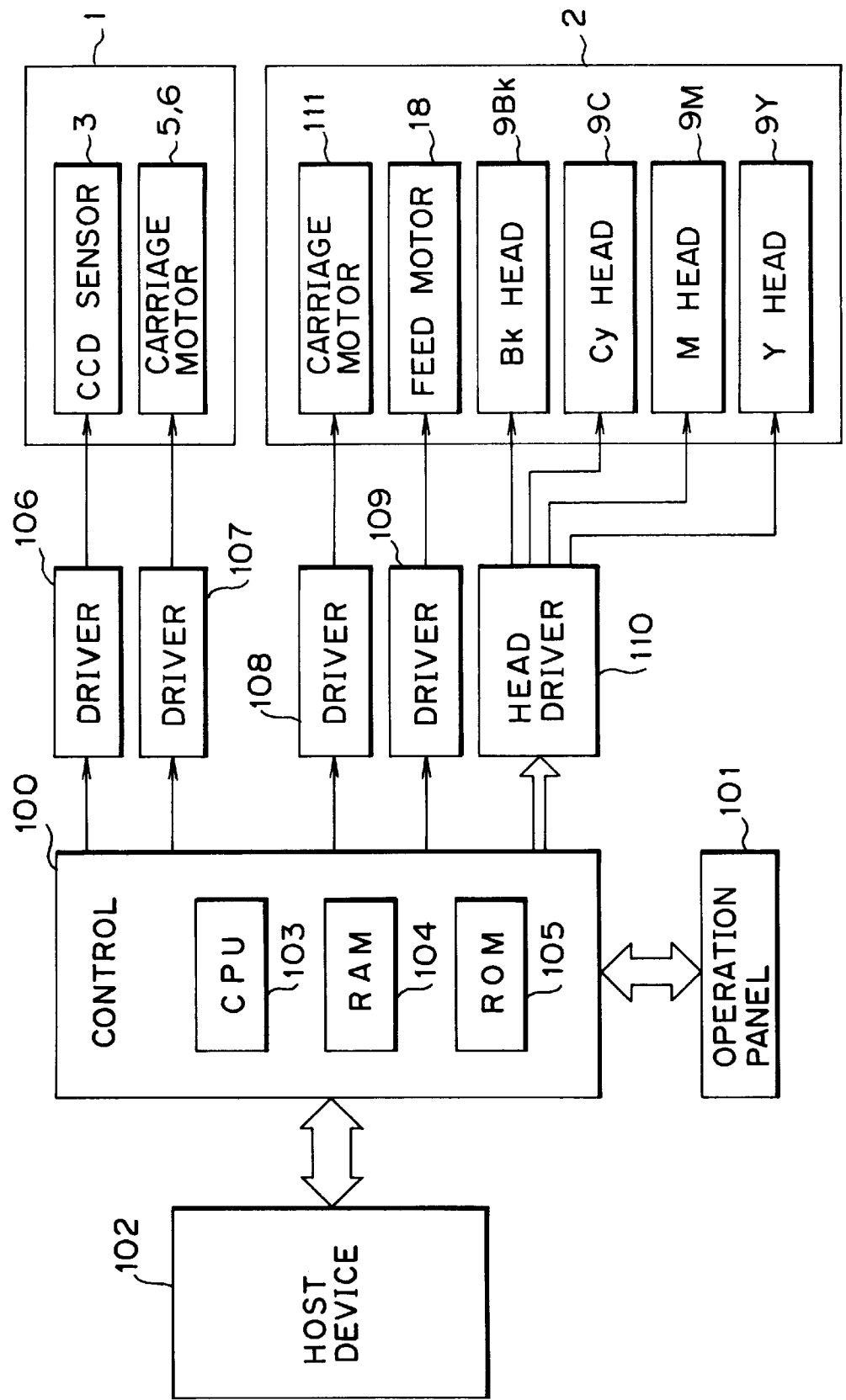
FIG. 3 shows a block diagram of the control system of the color copying machine.

FIG. 3 shows the control device 100 for driving the reader section 1 and the image-forming section 2. The device 100 accepts, stores, and processes input data, and produces output results for the image formation under the direction of the user (operator) through an operation panel 101, a host computer system 102, or the like. The control device 100 includes a central processing unit (CPU) 103, a random access memory (RAM) 104, and a read-only memory (ROM) 105. These units 103, 104, and 105 are communicated with each other by means of circuits (not shown) acting as a communication path.

The control device 100 controls the reader and image-forming sections 1, 2 via driver circuits 106, 107, 108, 109, and 110. For the reading section 1, the driver 106 sends signals from the control 100 to the CCD sensor 3 to read the document while the driver 107 sends signals from the control 100 to the motors 5, 6 to move the CCD sensor 3 in the main- and sub-scanning directions 31, 32. For the image-forming section 2, on the other hand, the driver 108 sends signals from the control 100 to the carriage motor 4 to move the carriage 12 in the main-scanning direction 22 or 23, the driver 109 sends signals from the control 100 to drive the motor 18 to transfer the recording medium 10 in the sub-scanning direction, and the driver 110 sends signals to the recording heads 9Bk, 9C, 9M, and 9Y, individually.

The operation panel 101 has a mode selecting means which is provided as a hand-operated switching system. The operator selects an appropriate image-recording mode from, for example first and second modes. The first mode is responsible for forming an image of multicolor while the second mode is responsible for forming an image of single-color. Therefore, the control device 100 controls the reader section 1 and the image-forming section 2 in accordance with the mode selected by the operator. The operation panel 101 also has a display for indicating the mode and other conditions of the recording and operation switches for inputting the information concerned about a size of the recording medium, and the like.

Figure 4:
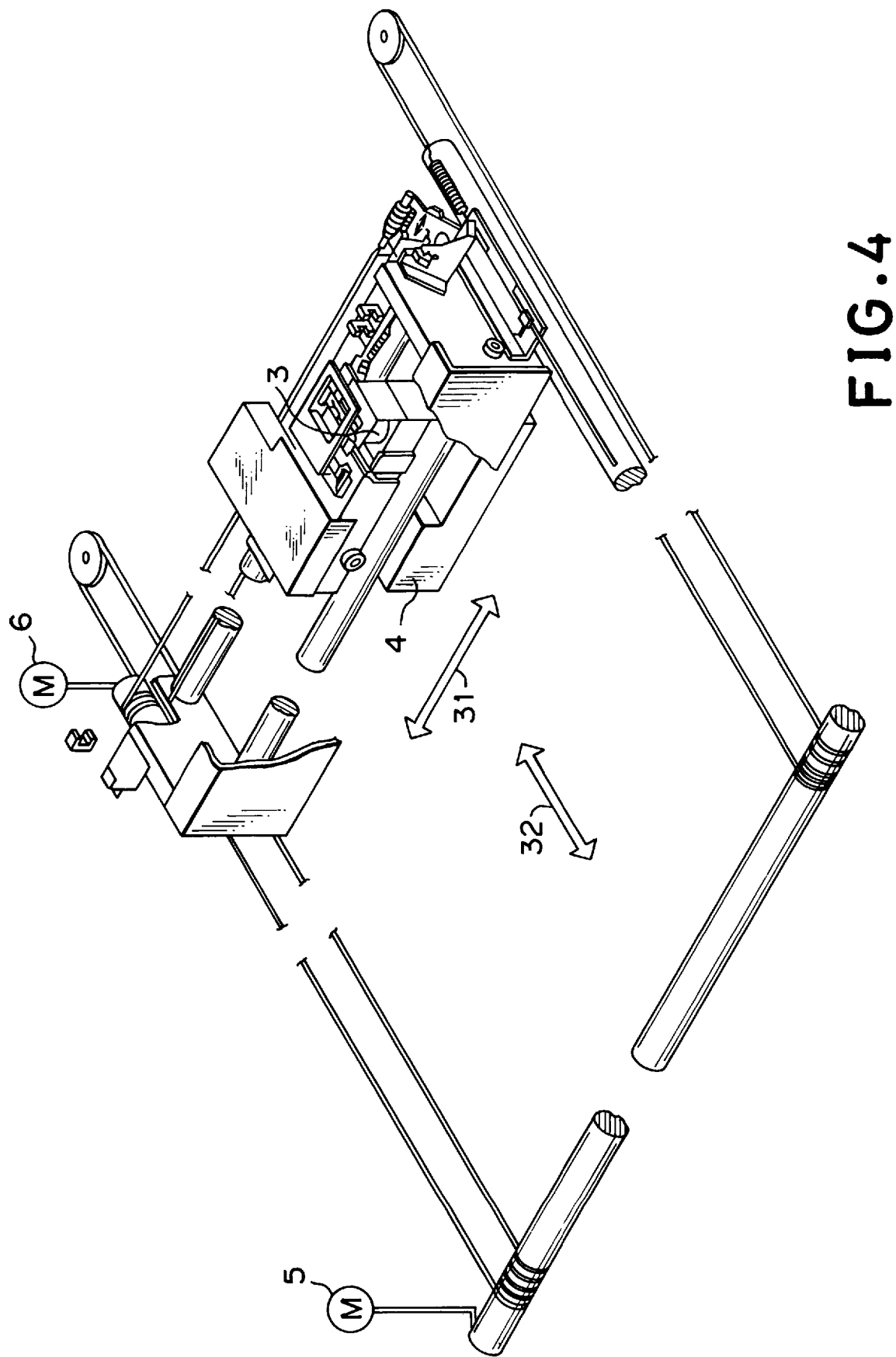
FIG. 4 shows a perspective view of the reader section of the color copying machine.
Figure 5:
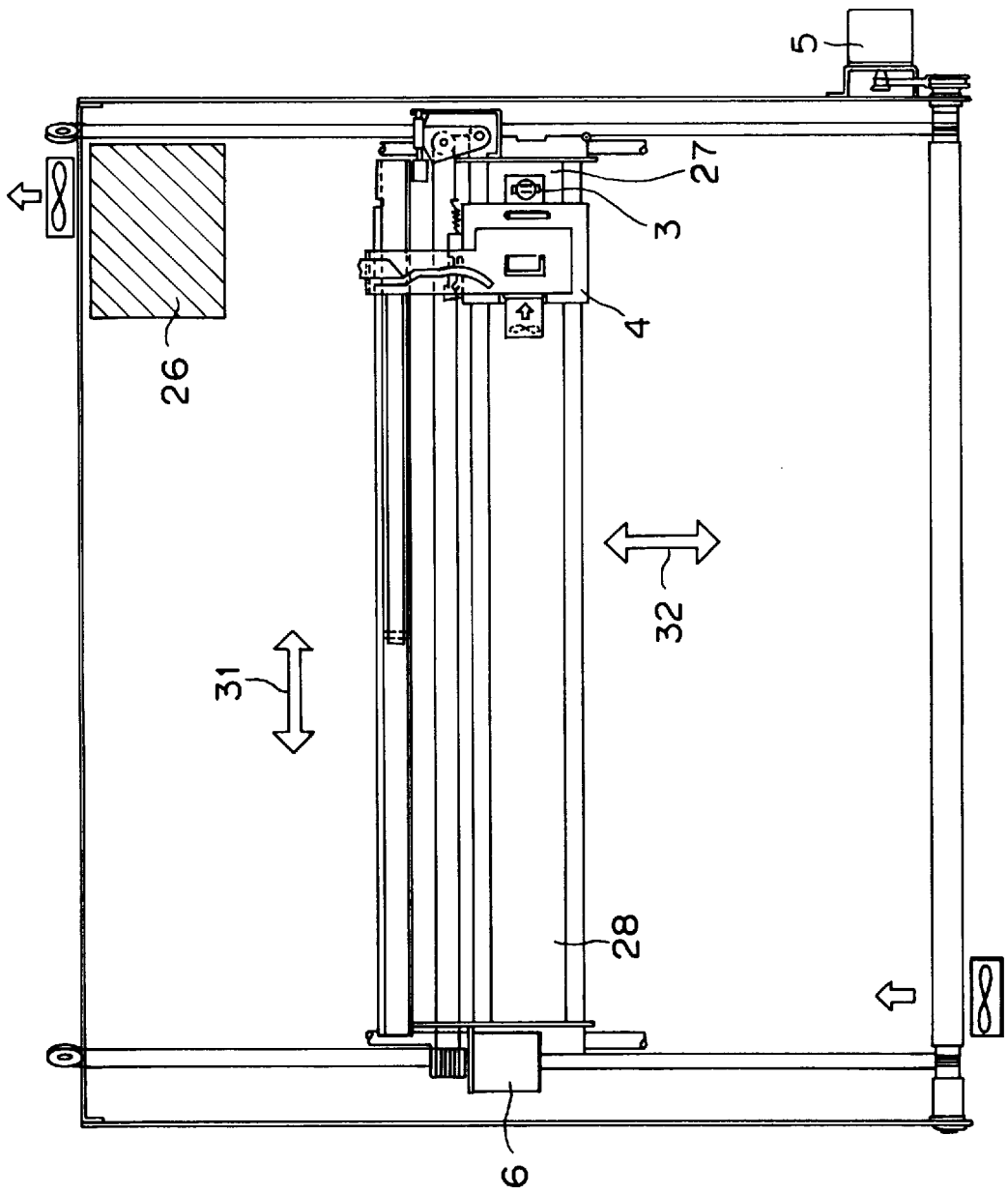
FIG. 5 shows a plan view of the reader section of the color copying machine.
Figure 6A:
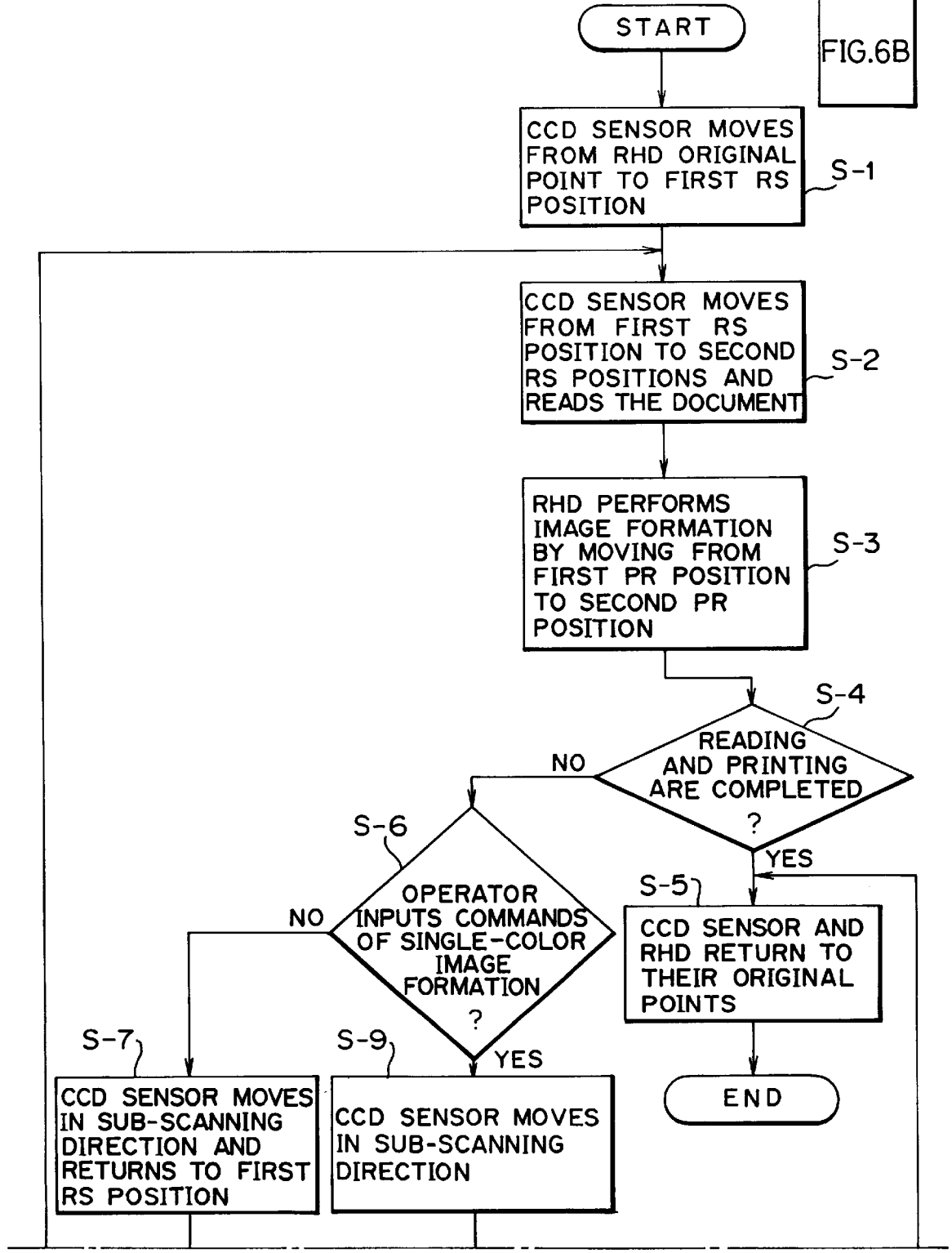
FIG. 6, which is comprised of FIGS. 6A and 6B, shows a flow diagram of the process of forming an image by the color copying machine in accordance with the first example.
Figure 6B:
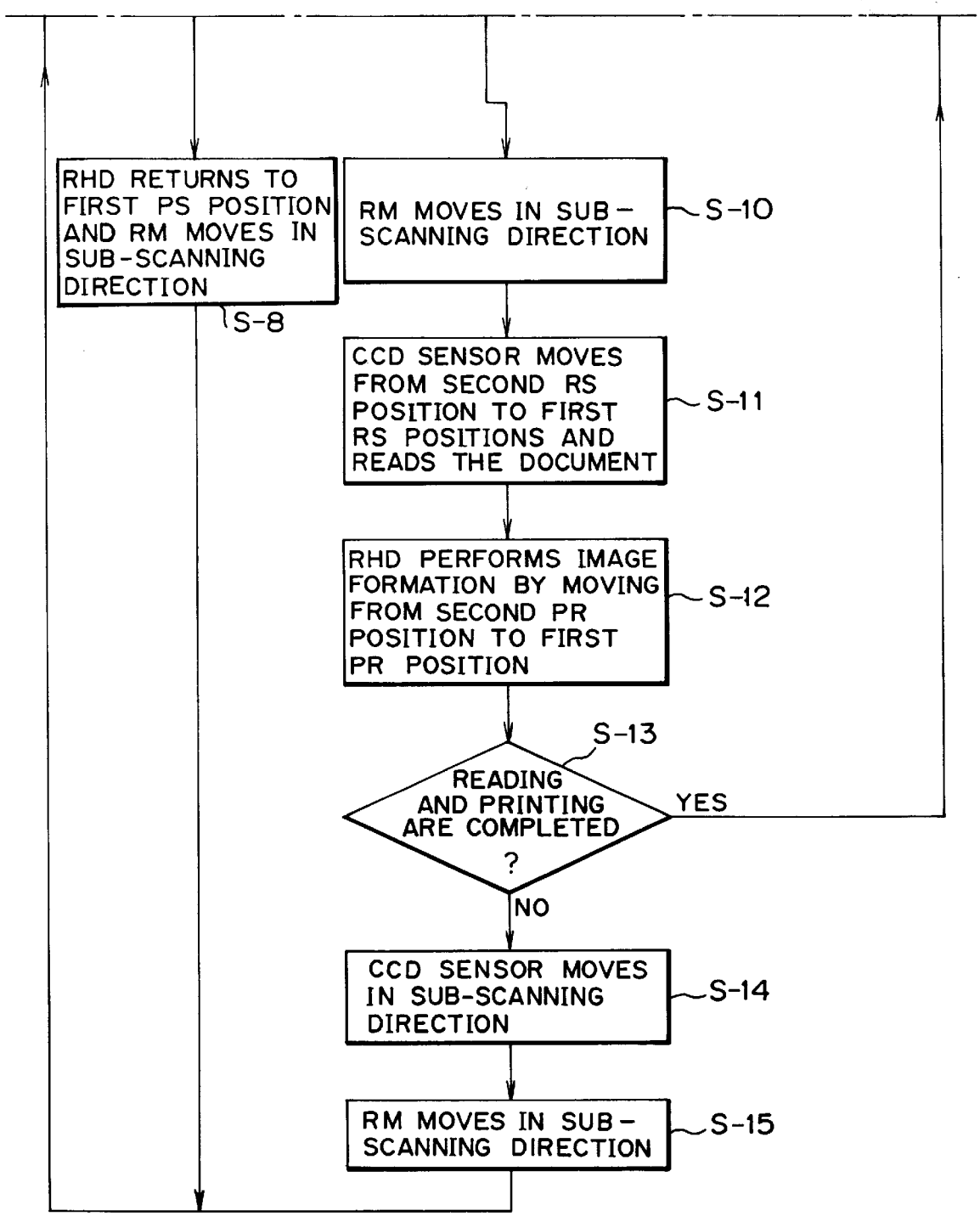

Referring now to FIGS. 4, 5, and 6A and 6B, the process of multicolor image formation by using the copying machine described above is explained hereinafter. FIGS. 4 and 5 are simplified perspective and front views of the reader section 2, respectively. Also, FIGS. 6A and 6B are flow diagrams of the process of forming a multicolor image.

As shown in FIGS. 4 and 5, the CCD sensor 3 performs a rectangular scanning on the original document 10 by moving in the main- and sub-scanning directions 31, 32 by means of the stepping motors 5 and 6.

During the period of a non-operational state of the reader section 1, the CCD sensor 3 stays at a rest position 26. In FIG. 5, the rest position 26 is a diagonally shaded area on a corner of a four-sided plane structure of the reader section 1. When the image-forming process is started, the CCD sensor 3 moves from the rest position 26 to a first read-starting position 27 (hereinafter, referred as the 1st RS position) (S-1). Then the CCD sensor 3 picks up image information on the recording medium 10 (RM) on the way from the 1st RS position 27 to another position corresponding to an end of the image to be formed in the main-scanning direction (S-2). Then the CCD sensor 3 stops at a predetermined stopping position beyond the limits of the reading. After arriving at the stopping position, the CCD sensor 3 moves in the sub-scanning direction 32 for a distance corresponding to a vertical length of a row of the orifices formed on the recording head unit 9 (i.e., the recording width of the head).

In the image-forming section 2, on the other hand, the carriage 12 moves from a first print-starting position 29 (hereinafter, referred as the 1st PS position) to a second print-starting position 30 (hereinafter, referred as the 2nd PS position) by sliding smoothly along two parallel guide rods 13 so as to correspond to the movement of the CCD sensor 3 of the reader section 1. During the movement, the recording head unit 9 prints one line of the image on the recording medium 10. The line formed has a width thereof corresponding to the recording width described above (S-3). As shown in FIG. 2, the heads 9Bk, 9M, 9C, and 9Y are arranged in that order along the direction of moving the carriage 12. Therefore, the recording head unit 9 performs the image formation by printing each color on the recording medium 10 in the order of black, magenta, cyan, and yellow.

If the reading and recording steps are concluded entirely (S-4), the CCD sensor 3 and the recording head unit 9 return to their original positions, respectively (S-5). If the further printing is required (S-4), on the other hand, further steps are performed.

In the step S-6, the image to be formed is verified whether it is in the type of single color. That is, the control device 100 detects whether a command of forming the single color image is inputted by the operator through the operation panel 104. If not, the CCD sensor 3 moves to the 1st RS position 27 in the main scanning direction 31 without capturing any information (S-7). Since then, the same steps are repeated and the CCD sensor 3 moves and reads the document, repeatedly.

In the image-forming section 2, on the other hand, the recording head unit 9 prints one line of the image on the recording medium 10 in accordance with the data provided from the reader section 1. After the printing, the recording medium 10 shifts its position exactly at a distance corresponding to the recording width of the recording head by means of the transfer rollers 3 and the tension rollers 4 driven by the pulse motors 18 through the belts 19, while the carriage 12 moves back to the 1st PS position 29 without performing the printing (S-8). In the back movement, as shown in FIG. 2, the carriage 12 moves toward the direction pointed by the arrow 23 by a driving means (not shown). After arriving at the 1st PS position 29, the carriage 12 moves toward the direction pointed by the arrow 22 and the recording head 9 scans and ejects ink droplets to print one line of the image. Since then, the same steps are repeated to successively print all of the lines forming the multicolor image.

If the operator decides that the image to be formed is in the type of single color (S-6), the following steps are performed.

In the case of forming the image represented by one of the colors selected by the operator through the operation panel 104, the CCD sensor 3 in the reader section 1 moves from the rest position 26 to the 1st RS position 27 as shown in FIG. 5. Then the CCD sensor 3 moves from the 1st RS position to another one corresponding to an end of the image to be formed in the direction of main-scanning 31. During the movement, it reads the document. After the reading, the CCD sensor 3 stops at a predetermined stopping position beyond the limits of the reading and then moves over a distance corresponding to the recording width of the recording head 9 in the direction of sub-scanning 32 (S-9). At this time, the CCD sensor 3 does not move toward the direction of main-scanning 31. In the next step, the recording medium 10 moves exactly for the distance corresponding to the recording width by the transfer rollers 15 and the tension rollers 16 driven by a pulse motor 18 through power-transfer means 19 (S-10). Then the CCD sensor 3 moves from the 2nd RS position 28 to the 1st RS position 27 and at the same time it reads the document (S-11). After the reading, the CCD sensor 3 moves in the sub-scanning direction 32 for the distance corresponding to the recording width of the recording head 9. Since then, the same steps are repeated and the CCD sensor 3 moves and reads the document. In the image-forming section, on the other hand, it goes through a series of the steps described above to record a first line of the image onto the recording medium 10.

Among the recording heads 9Bk, 9C, 9Y, and 9M shown in FIG. 2, only one head corresponding to the color selected by the operator ejects ink droplets. When the movement of the recording head unit 9 has completed, the carriage 12 moves from the PS position 30 along the arrow 23. During the movement, the recording head unit 9 ejects ink droplets onto the recording medium 10 to print the image corresponding to the image data (S-12). After that, in the step S-13 there is a judgment whether the reading and recording steps are completed. If the reading and recording steps are not completed (S-13), the following steps are performed. That is, after arriving the carriage 21 at the 1st PS position the CCD sensor 3 moves in the sub-scanning direction 32 (S-14) while the recording medium 10 moves in the sub-scanning direction 17 (S-15) for the distance corresponding to the recording width of the recording head unit 9. After shifting the recording medium 10 completely, the above steps are repeated to form the single color image.

EXAMPLE 2

In this example, a color image forming apparatus has a structure identical with that of the first example except of a digitizer 33 provided on the document holder 8 of the reader section 1. The image-forming apparatus of the present example forms a single color image by performing the same image-forming process as described in the first example by activating one of the recording heads. In addition, the image-forming apparatus of the present example also performs the process of forming a color image including at least one multicolor area and at least one single color area with the shape of a rectangle.

Figure 7:
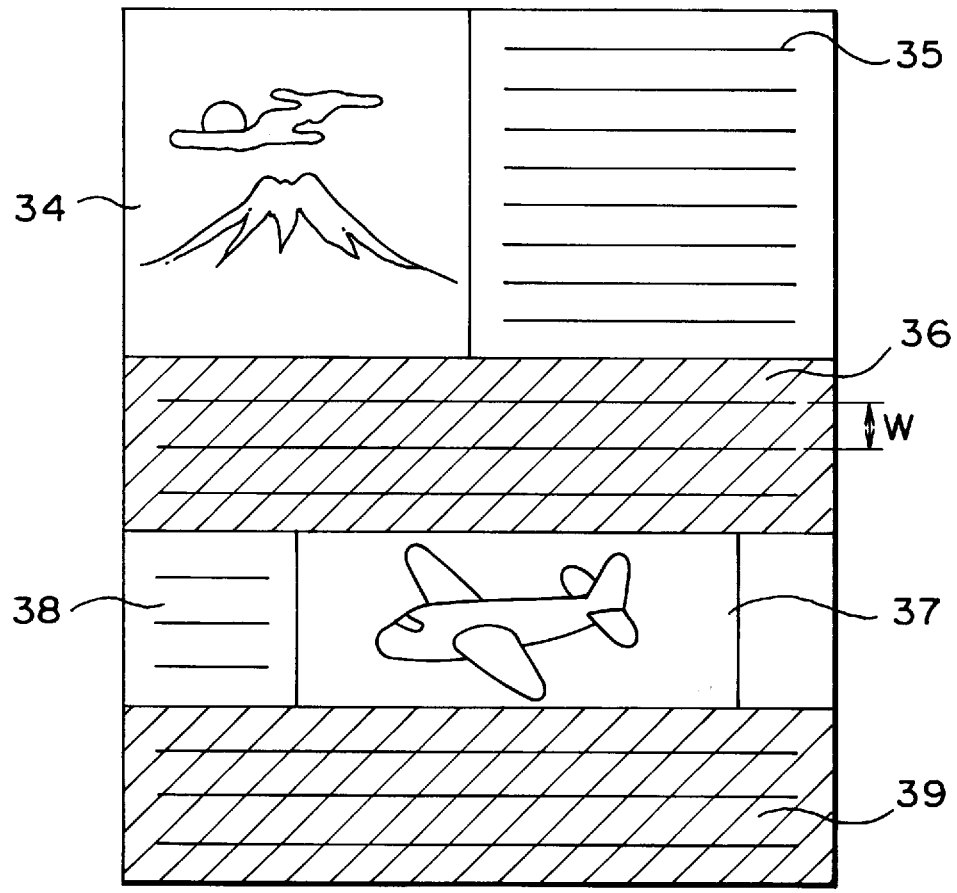
FIG. 7 shows a pictorial view of an image to be formed by the color copying machine.

As shown in FIG. 7, for example, the color image to be formed consists of: an upper portion including a figure as a multicolor area 34 and a text as a black-and-white or a single color area 35; a middle portion including an upper part as a single color area 36 and a lower part having a multicolor area 37 and a single color area 38; and a lower portion including a single color area 39. As will be seen in FIGS. 8A and 8B, the areas 36 and 39 satisfy the criteria.

Figure 8A:
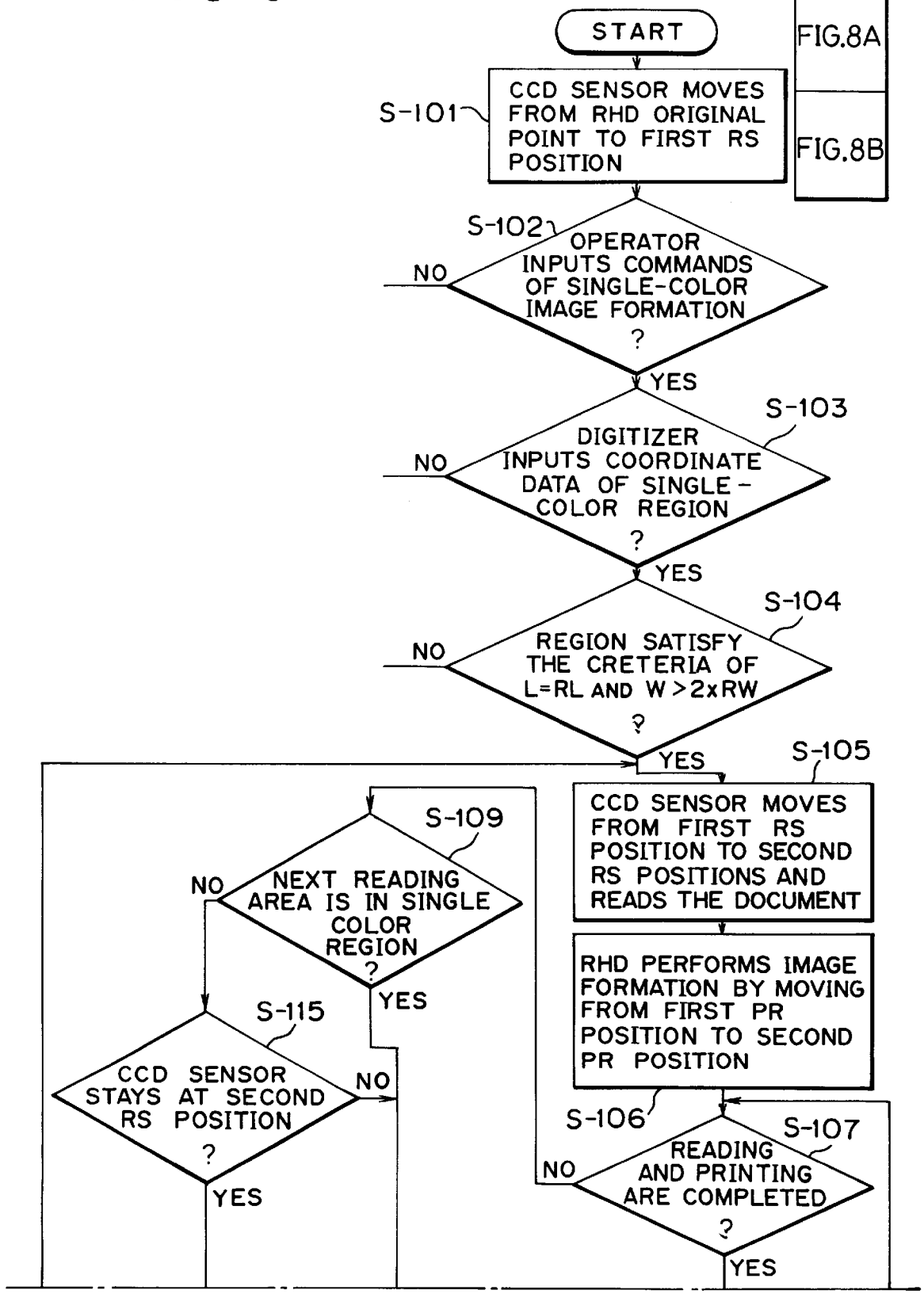
FIG. 8, which is comprised of FIGS. 8A and 8B, shows a flow diagram of the process of forming an image by the color copying machine in accordance with the second preferred embodiment of the present invention.
Figure 8B:
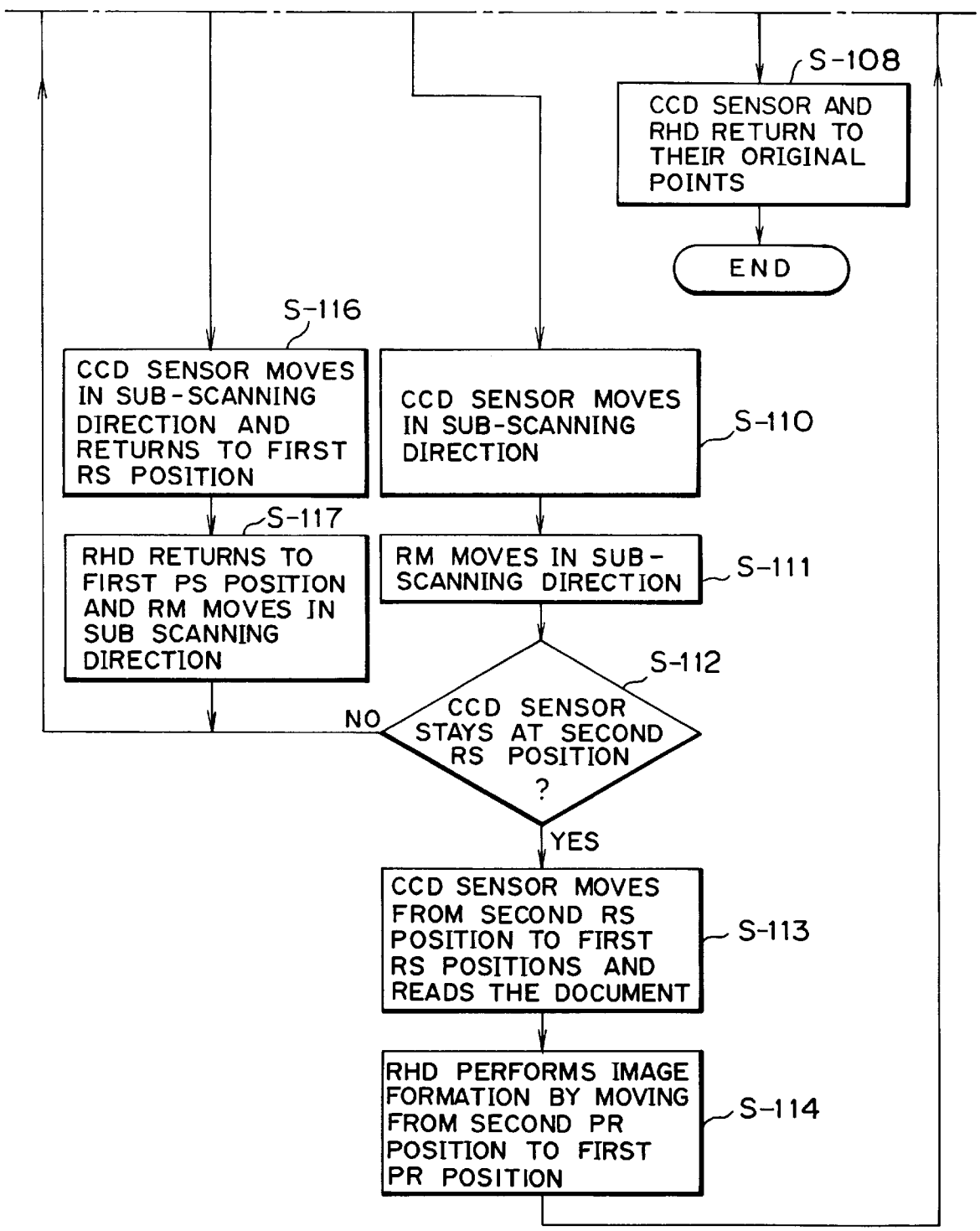

FIGS. 8A and 8B are a flow diagram summarizing the process according to the second example.

At first, the operator puts the original document on the digitizer 33 and pushes a start button on the operation panel 104 to start the process.

In the first step (S-101), the CCD sensor 3 shifts from the position corresponding to the original point of the recording head unit 9 to the position for starting the movement. The operator inputs data of the original image in the document as coordinate data by means of the digitizer 33 (S-102). The coordinate data corresponds to a diagonal coordinate of each area to be formed as a single color area or a diagonal coordinate of each of rectangles constituting a single color area to be printed by one of the recording heads (S-102). If the shape of the area to be formed is complicated, it can be divided into several areas with a shape of rectangle so as to be easily scanned by the digitizer 33 (S-103).

The input data that corresponds to the single-color area of the image is transferred into the central processing unit (CPU) 103 of the control device 100. Then the CPU 100 processes the data by the following steps in FIG. 8.

First of all, the single color area or areas of the image can be selected as follows (S-104). That is, the CPU compares the size of the rectangle with the previously stored criteria to determine if there is a match. Only the rectangle matching up with the criteria is taken into further processing. In this example, the criteria are as follows: (i) a width (W) of the rectangle is twice longer than a recording width (RW) of the recording head (i.e., W>2×RW); and (ii) a length (L) of the rectangle matches a recording length (RL) of the recording head (L=RL).

In this criteria, the width (W) is defined as a length of one side of the rectangle in the direction of transferring the recording medium 10; the length (L) is defined as a length of another side of the rectangle in the direction of moving the recording head unit 9; the recording width (RW) is defined as a vertical length of rows of the orifices in the sub-scanning direction; and the recording length (RL) is defined as a horizontal length of rows of the orifices in the main-scanning direction.

If the image to be formed does not include any area with the shape of rectangle matching up with the criteria, the CCD sensor 3 reads the document only on the one way of the movements while the recording head 9 prints each line of the image on the recording medium 10 only on the way from the predetermined direction.

If the image to be formed includes at least one rectangle matching up with the criteria, for example the original shown in FIG. 7, the following steps are carried out.

At first, an image area corresponding to the upper part of the original is formed. In this case, there are no rectangles matching up with the criteria, so that the recording head unit 9 prints each line of the image area only on the one way of the movement. For the one way printing, the CCD sensor 3 starts to read the original from the side of the 1st RS position to the side of the 2nd RS position (S-105). Then, the CCD sensor 3 moves toward the 2nd RS position and stops at a position corresponding to an end of the image area to be formed. At this time, the CPU 103 references the area to be read by the next scanning movement from the number of pulses applied on the stepping motors 5 and 6 which are responsible to move the sensor in the main- and sub-scanning directions 31, 32, respectively.

When the next is not included in the single-color area, the next scanning movement is performed by the same way as described above. That is, the CCD sensor 3 returns toward the 1st RS position and at the same time it moves for the distance corresponding to the recording width of the recording head unit 9 in the direction 32 perpendicular to the scanning 31. Then the image-forming section 2 performs an image formation while the recording head unit 9 shown in FIG. 2 moves from the 1st RS position 29 to the second one 30 (S-106). As a consequence, further scanning and recording movements are performed successively. At the end of the reading movement, furthermore, the CPU 103 references the number of pulses applied on the stepping motors 5 and 6 and the coordinates provided by the digitizer 33.

In the step of 107 (S107), the control device 100 judges whether all of the reading and recording movements are completed. If it is completed, the CCD sensor 3 and the recording head unit 9 returns to their original points to complete the image formation. If it is not completed, it goes the step of S-9.

In the step S109, the control device 100 finds out whether an image area to be read by the next scanning movement of the CCD sensor is partially included in the single-color area. If it is included, the recording and image-forming steps are performed by the same way as described above.

After the end of reading the image area by the CCD sensor 3, the CCD sensor 3 starts to move only in the sub-scanning direction 32 when the region to be read by the next scanning movement of the CCD sensor 3 is included in the single-color area (S-110). Then, the recording medium 10 moves in the sub-scanning direction 17 (S-111). In the step S112, the system finds out whether the CCD sensor is located on the second reading start position (hereinafter, referred as the 2nd RS position). If it is located, the CCD sensor 3 starts to read the document toward the opposite direction by moving from the 2nd RS position to the 1st RS position (S-113). In the image-forming section, on the other hand, the recording head 9 shown in FIG. 2 is stopped at the 2nd PS position 30. After the reading, the recording head unit 9 starts to print the image area with its backward movement from the 2nd PS position 30 to the 1st PS position 29.

After the end of reading the image area by the CCD sensor 52, the central processing unit (CPU) 70 references an image area to be read by the next scanning movement from the number of pulses applied on the stepping motors 56 and 57 and then compares the area with the single color area which is inputted by the operator. Then the further reading and the recording movements are performed up to the time that a part of the region to be read is one which is not included in the single-colored area.

If a part of the original to be scanned by the reader section 1 is not included in the single-color area, the reader section 1 performs its reading movement as follows.

When the CCD sensor 3 is located at the 1st RS position 27, to begin with, it starts to move only in the sub-scanning direction 32. During the movement from the 1st RS position 27 to the 2nd RS position 28, but not in the opposite direction, the CCD sensor 3 reads the original document. After the reading procedure, the CCD sensor 3 moves in the scanning direction 31 to the 1st RS position 27. In the image-forming section as shown in FIG. 2, on the other hand, the recording medium 10 is transferred for a predetermined distance in accordance with the movement of the recording device. After that, the recording is only performed during the movement of the recording head unit 9 from the 1st PS position 29 to the 2nd PS position 30. After the recording and also after that the arrival of the recording head unit 9 at the 2nd PS position 30, the recording medium 10 moves for the distance corresponding to the recording width of the recording head unit 9 which moves to the 1st PS position 5 without printing. Then the steps described above are repeated.

Next we will explain further steps for when a part of the original to be read is not included in the single-color area and the CD sensor 52 is located on the 2nd RS region 28 (S-115).

In this case, the CCD sensor 3 starts to move from the 2nd RS position 28 to the 1st RS position 27 in the scanning direction without performing the reading procedure (S-116). After that, the CCD sensor 3 reads the document only on the way from the 1st RS position 27 to the 2nd RS position 28 and repeats the steps described above. In the image-forming section 2, the recording medium 10 is transferred for a predetermined distance after the recording head unit 9 arrives on the 2nd PS position 30 shown in FIG. 2. Then the recording head unit 9 moves to the 1st PS position without performing the recording procedure (S-117). After the step 106, the recording head unit 9 performs the image formation only on the way from the 1st PS position 29 to the 2nd PS position 30 (S-105, S-106).

According to the above-described examples, the operator inputs data concerned about a single-color part of the original by using the digitizer 33. However, it is also possible to input data concerned about a multicolor part of the original image by using the digitizer 33 and process data concerned about other parts of the original as a single color part.

EXAMPLE 3

An image forming apparatus of the present example has a structure identical with that of the first and second examples shown in FIGS. 1 and 2 except that the CCD sensor 3 of the reader section 1 reads the document only on the way from the first reading start position 27 to the second reading start position 28. In addition, the image-forming section 1 has a memory device 11 for storing the image data corresponding to a part of the image to be formed by one scanning movement of the recording head unit.

Figure 9A:
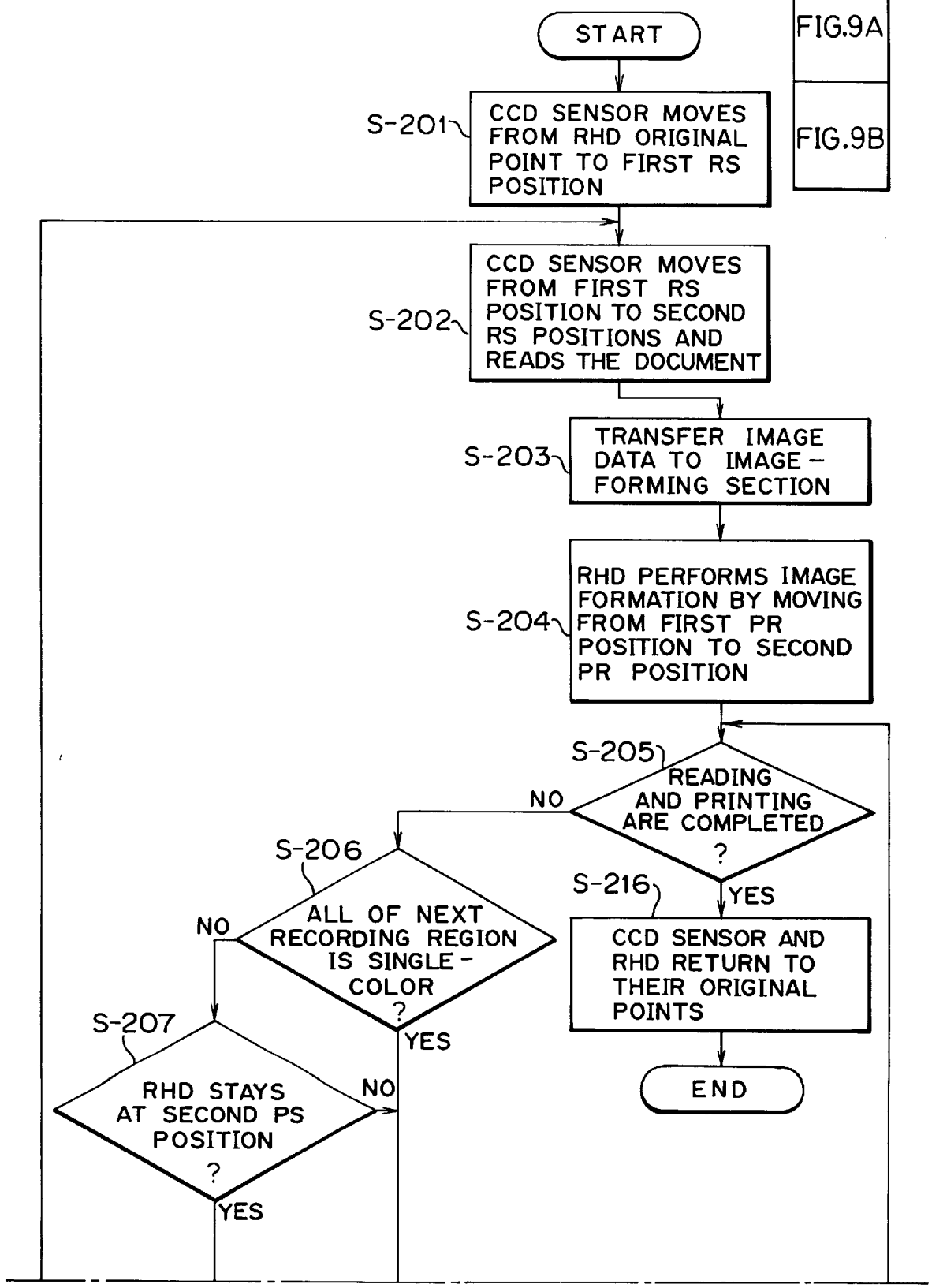
FIG. 9, which is comprised of FIGS. 9A and 9B, shows a flow diagram of the process of forming an image by the color copying machine in accordance with the third preferred embodiment of the present invention.
Figure 9B:
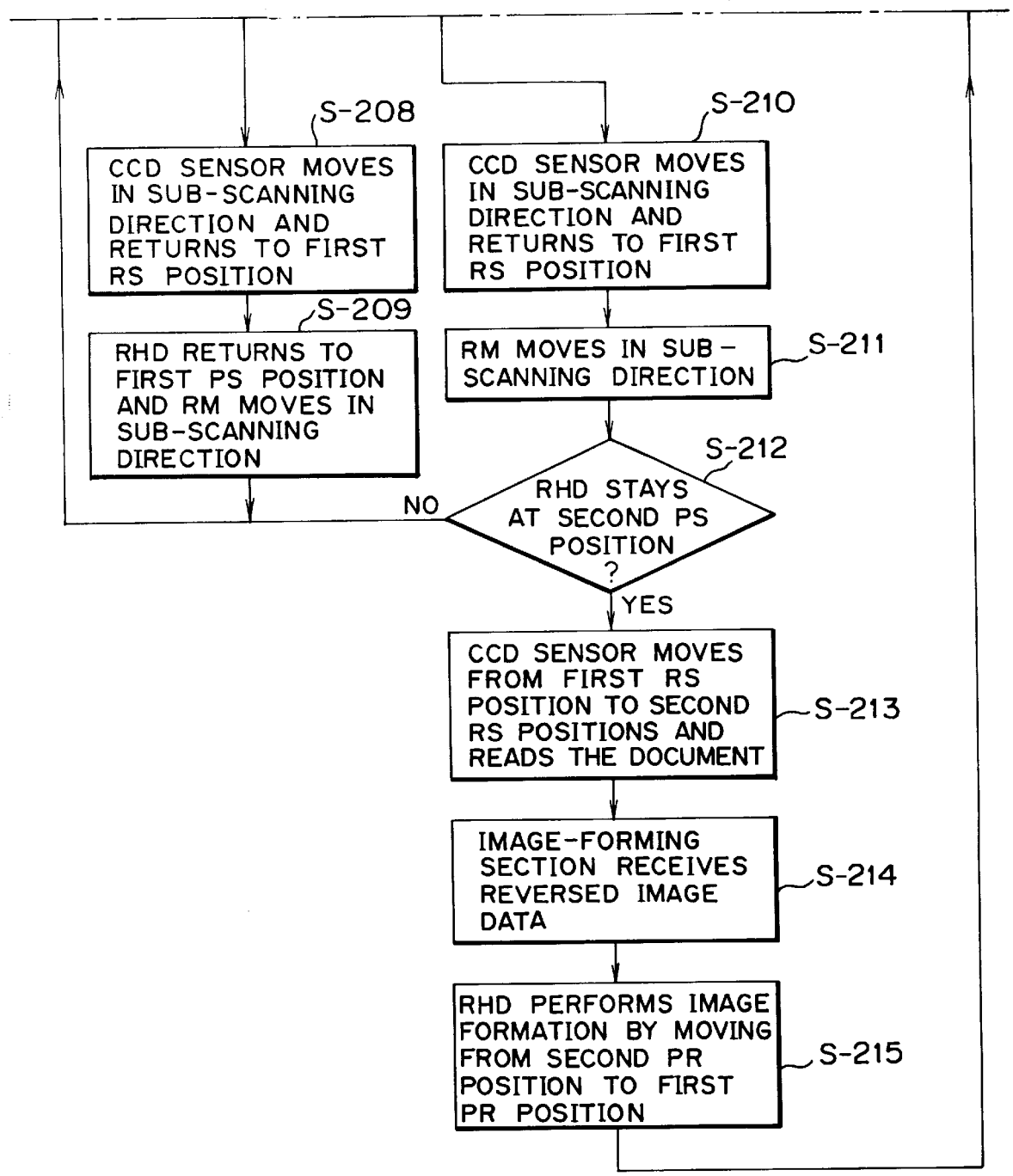

In this example, the image forming apparatus performs the image formation as summarized in a flow diagram of FIGS. 9A and 9B. The reader section 1 reads the image data and sends them to the memory device 11 in which the data is temporarily stored. Then the stored data is taken out from the memory 11 and is supplied into the recording head unit 9 (S-201, S-202, S-203, and S-204).

If the image data corresponds to a multicolor image (S-205: judge whether the recording movement is complicated, and S-206: judge whether the image is a multicolor), the image data is provided into the recording head unit 9 in order of when put in the memory 11. In the image-forming section 2, the recording head unit 9 records the image on the recording medium 10 only during the course of moving from the 1st PS position 29 to the 2nd PS position 30 (S-207). Following that the recording head unit 9 records one line of the image, the recording medium 10 is transferred for the distance corresponding to a recording width and, at the same time, the recording head unit 9 moves from the 2nd PS position 30 to the 1st PS position 29 without printing (S-208, S-209). Then the steps described above are repeated.

If the image signals correspond to a single color image to be formed by one of the recording heads (S-205: judge whether the recording movement is complicated, and S026: judge whether the image is a multicolor), the system performs further steps S210–S215.

If the recording head unit 8 is positioned at the 2nd PS position after the preceding recording movement, the reader section 1 sends a sequence of image signals to a memory device 11 while the recording head unit 9 receives them in a reverse order from the memory 11. The recording medium 10 moves for a distance corresponding to the recording width while the recording head unit 9 stays at the 2nd PS position 30. Then the recording head unit 9 moves from the 2nd PS position 30 to the first one 29 and at the same time it performs the image formation on the recording medium 10. After reaching the recording head unit 9 to the 1st PS position 29, the recording medium 10 moves for the distance corresponding to the recording width again. Then the steps described above are repeated.

If the reading and recording movements are completed, the CCD sensor 3 and the recording head unit 9 return to their original points and then the image formation is finished (S-205 and S206).

Accordingly, as described above, the image forming apparatus of the present invention substantially accelerates time for the single-color image formation to request the user's demands if he or she selects a single-color mode on the operation panel, while the conventional apparatus cannot.

According to the present invention, a single-color image can be formed by a single recording head during a period of performing a serial-scanning movement between two opposite positions while multicolor images can be formed by combination of color recording heads during a period of performing a serial-scanning movement in one direction only.

For that reason, the image-forming apparatus of the present invention will be able to accelerate time for forming a color image as a combination of single-color and multi-color image areas without causing any variations in color tone, and it can be more appropriate when the multicolor areas make up a small proportion of the image.

As described above, the image forming apparatus of the present invention dramatically accelerates time for the single-color image formation to request the operator's demands, while the conventional apparatus cannot. The single color image can be only formed by an individual recording head during the period of moving the head back and forth alternately, while the multicolor image can be only formed during the period of moving the head toward one direction. Accordingly, the image-forming apparatus of the present invention will be able to accelerate time for forming the image including single-color portions and multi-color portions without causing any variations in color tone. It can be effective when the color areas make up a small proportion of the image.

VARIOUS ASPECTS OF THE INVENTION

In the above examples 1–3, as already described, the image-forming apparatuses are in the type of performing the ink-jet recording process and its inkjet recording heads have heating elements that produce thermal energy as energy for ejecting drops of ink. Therefore, high density of picture elements and high resolution of the recording can be obtained by the image-forming apparatuses of the examples described above.

The typical structure and the principle are preferably the ones disclosed in U.S. Pat. Nos. 4,723,129 and 4,740,796. The principle is applicable to a so-called on-demand type recording system and a continuous type recording system. Particularly however, it is suitable for the on-demand type because the principle is such that at least one driving signal is applied to an electrothermal transducer disposed on liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Patent Application Laying-Open No. 123670/1984 wherein a common slit is used as the ejection outlet for a plurality of electrothermal transducers, and to the structure disclosed in Japanese Patent Application Laying-Open No. 138461/1984 wherein an opening for absorbing pressure waves of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of recovery means and the auxiliary means for the preliminary operation are preferable, because they can further stabilize the effect of the present invention. As for such means, there are capping means for the recording head, cleaning means therefor, pressurizing or suction means, preliminary heating means by the ejection electrothermal transducer or by a combination of the ejection electrothermal transducer and additional heating element and means for preliminary ejection not for the recording operation, which can stabilize the ink ejection from the orifices of the recording head.

Furthermore, although the above-described embodiments use liquid ink, inks that are liquid when the recording signal is applied can be used: for example, inks can be employed that solidify at temperature lower than the room temperature. This is because in the ink-jet system, the ink is generally temperature adjusted in a range of 30°–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-Open Nos. 56847/1979 or 71260/1985. The present invention is most effective when it uses the film boiling phenomenon to expel the ink.

Furthermore, the ink-jet recording apparatus of the present invention can be employed not only as an image output terminal of an information processing device such as a computer, but also as an output device of a copying machine including a reader, as an output device of a facsimile apparatus having a transmission and receiving function, and as an output device of an optical disc apparatus for recording and/or an optical disc apparatus for recording and/or reproducing information into and/or from an optical disc.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image-forming apparatus comprising:
   transport means for transporting a recording medium;
   generation means for generating image data;
   a plurality of recording heads arranged along a scanning direction different from a direction of transporting said recording medium for recording an image in accordance with said image data;
   movement means for moving said plurality of recording heads in said scanning direction to perform a recording movement;
   selection means for selecting either a first mode in which a multicolor image is formed by said plurality of recording heads during a period of moving in one direction or a second mode in which a single-color image is formed by one of said plurality of recording heads in two opposite directions; and
   control means for controlling said recording movement of said plurality of recording heads in accordance with said mode selected by said selection means.

2. An image-forming apparatus as claimed in claim 1, wherein
   said selection means comprises a hand-operated switching system on an operation panel by which said first mode or said second mode is manually selected.

3. An image-forming apparatus as claimed in claim 1, wherein
   said selection means comprises an external input device by which said first mode or said second mode is selected.

4. An image-forming apparatus as claimed in claim 1, wherein
   said generation means comprises an image reader having a CCD image sensor which picks up image information on an original with a serial-scanning movement thereof during a period of moving at least in one direction.

5. An image-forming apparatus as claimed in claim 4, wherein said CCD image sensor picks up said image information on said original with said serial-scanning movement thereof during a period of moving at least in one direction in accordance with the mode selected by said selection means.

6. An image-forming apparatus as claimed in claim 1, wherein
   said generation means obtains image information from an external input device.

7. An image-forming apparatus as claimed in claim 1,
   further comprising storing means for storing at least a part of said image data which corresponds to an image to be formed by one scanning movement of said plurality of recording heads.

8. An image-forming apparatus as claimed in claim 1, wherein
   each recording head of said plurality of recording heads comprises electro-thermal converting elements for generating energies to be used for ejecting ink droplets on said recording medium by causing a film boiling phenomena in ink.

9. An image-forming apparatus comprising:
   transport means for transporting a recording medium;
   generation means for generating image data;

a plurality of recording heads arranged along a scanning direction different from a direction of transporting said recording medium for recording an image in accordance with said image data;

movement means for moving said plurality of recording heads in said scanning direction to perform a recording movement;

selection means for selecting one mode from a first mode in which a multicolor image is formed by said plurality of recording heads during a period of moving in one direction, a second mode in which a single-color image is formed by one of said plurality of recording heads during a period of moving in two opposite directions, and a third mode in which a combination of images is formed by performing both said first and second modes; and control means for controlling said recording movement of said plurality of recording heads in accordance with said mode selected by said selection means; and judging means for, when said image is comprised of single color areas and multi-color areas with shapes of rectangles, judging a size of each single color area, wherein said one mode is selected from said first, second, and third modes in accordance with a result of said judging by said judging means.

10. An image-forming apparatus as claimed in claim 9, further comprising digitizing means for estimating and inputting said size of each single-color area.

11. An image-forming apparatus as claimed in claim 9, wherein a part of said single-color area of said image is recorded under said first mode while a remaining part thereof is recorded under said second mode when said size of said single-color area meets criteria of:

W>2 RW; and

L=RL where

"W" is a width of said single-color area in said direction of transporting said recording medium;

"L" is a length of said single-color area in said direction perpendicular to the direction of transporting said recording medium;

"RW" is a recording width of said recording head in said direction perpendicular to the direction of scanning movement; and "RL" is a recording length of said recording head in said direction of scanning movement.

12. An image-forming apparatus as claimed in claim 9, wherein said selection means for selecting one mode comprises a hand-operated switching system on an operation panel by which said one mode is manually selected from said first, second, and third modes.

13. An image-forming apparatus as claimed in claim 9, wherein said selection means for selecting one mode comprises an external input device by which said one mode is selected from said first, second, and third modes.

14. An image-forming apparatus as claimed in claim 9, wherein said generation means comprises an image reader having a CCD image sensor which picks up image information on an original with a serial-scanning movement thereof during a period of moving at least in one direction.

15. An image-forming apparatus as claimed in claim 14, wherein said CCD image sensor picks up said image information on said original with said serial-scanning movement thereof during a period of moving at least in one direction in accordance with the mode selected by said selection means.

16. An image-forming apparatus as claimed in claim 9, wherein said generation means obtains image information from an external input device.

17. An image-forming apparatus as claimed in claim 9, further comprising storing means for storing at least a part of said image data which corresponds to an image to be formed by one scanning movement of said plurality of recording heads.

18. An image-forming apparatus as claimed in claim 9, wherein each recording head of said plurality of recording heads comprises electro-thermal converting elements for generating energies to be used for ejecting ink droplets on said recording medium by causing a film boiling phenomena in ink.

19. A method of forming an image on a recording medium by using a plurality of recording heads arranged along a scanning direction different from a direction of transporting said recording medium and moving said plurality of recording heads back and forth in said scanning direction in accordance with image data, said method comprising the steps of:

judging whether said image is of a single-color type corresponding to one of said plurality of recording heads or a multi-color type;

recording said image during a period of moving said plurality of recording heads in two opposite directions when said image is judged in said judging step to be of the single-color type corresponding to one of said plurality of recording heads; and recording said image during a period of moving said plurality of recording heads in one of two opposite directions when said image is judged to be of the multicolor type.

20. A method of forming an image on a recording medium by using a plurality of recording heads arranged in parallel along a scanning direction different from a direction of transporting said recording medium and moving said plurality of recording heads back and forth in said scanning direction in accordance with image data, said method comprising the steps of:

judging whether said image is of a single-color type corresponding to one of said plurality of recording heads or a multi-color type;

recording said image during a period of moving said plurality of recording heads in two opposite directions when said image is judged in said judging step to be of the single-color type corresponding to one of said plurality of recording heads;

recording said image during a period of moving said plurality of recording heads in one of two opposite directions when said image is judged to be of the multicolor type;

judging, when said image is comprised of a single-color image area and a multicolor image area with shapes of rectangles. a size of each single color area; and recording a part of said single-color image area of said image during a period of moving said plurality of recording heads in one of two opposite directions, and recording a remaining part of said single-color image area of said image during a period of moving said plurality of recording heads in two opposite directions, when said size of said single-color area meets criteria of:

W>2 RW; and

L=RL where

"W" is a width of said single-color area in said direction of transporting said recording medium;

"L" is a length of said single-color area in said direction perpendicular to the direction of transporting said recording medium;

"RW" is a recording width of said recording heads in said direction perpendicular to the direction of scanning movement; and "RL" is a recording length of said recording heads in said direction of scanning movement.

* * * * *